(12) United States Patent
Kuroda et al.

(10) Patent No.: US 11,273,744 B2
(45) Date of Patent: Mar. 15, 2022

(54) VEHICLE SEAT STRUCTURE

(71) Applicant: MAZDA MOTOR CORPORATION, Hiroshima (JP)

(72) Inventors: Masanari Kuroda, Higashihiroshima (JP); Akinari Koga, Tokyo (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 28 days.

(21) Appl. No.: 16/955,018

(22) PCT Filed: Mar. 8, 2019

(86) PCT No.: PCT/JP2019/009239
§ 371 (c)(1),
(2) Date: Jun. 17, 2020

(87) PCT Pub. No.: WO2019/188107
PCT Pub. Date: Oct. 3, 2019

(65) Prior Publication Data
US 2020/0376994 A1    Dec. 3, 2020

(30) Foreign Application Priority Data

Mar. 26, 2018 (JP) .............................. JP2018-057411

(51) Int. Cl.
*B60N 2/70* (2006.01)
*B60N 2/64* (2006.01)
*B60N 2/66* (2006.01)

(52) U.S. Cl.
CPC ........... *B60N 2/7094* (2013.01); *B60N 2/643* (2013.01); *B60N 2/66* (2013.01)

(58) Field of Classification Search
CPC .......................... B60N 2/7094; B60N 2/4228
See application file for complete search history.

(56) References Cited

U.S. PATENT DOCUMENTS

| 2007/0236071 A1 | 10/2007 | Fujita et al. |
| 2012/0038199 A1 | 2/2012 | Matsumoto et al. |
| 2013/0175838 A1 | 7/2013 | Oshima et al. |

(Continued)

FOREIGN PATENT DOCUMENTS

| CN | 103079887 A | * | 5/2013 | .......... B60N 2/7094 |
| DE | 100 66 052 A1 | | 7/2002 | |
| EP | 2 423 037 A1 | | 2/2012 | |

(Continued)

OTHER PUBLICATIONS

The extended European search report issued by the European Patent Office dated Mar. 12, 2021 which corresponds to European Patent Application No. 19774741.3-1012 and is related to U.S. Appl. No. 16/955,018.

(Continued)

*Primary Examiner* — Timothy J Brindley
(74) *Attorney, Agent, or Firm* — Studebaker & Brackett PC

(57) ABSTRACT

A seat back (20) includes an upper thoracic support section (20a) for supporting at least a portion corresponding to a lower part of the upper thoracic spine of a seated occupant, and a lower thoracic support section (20b) disposed on a front side with respect to the upper thoracic support section (20a) and configured to support a portion corresponding to the lower thoracic spine of the seated occupant. The lower thoracic support section (20b) is configured to displace backward greatly, as compared with the upper thoracic support section (20a) in such, a way that the upper thoracic spine of the seated occupant is inclined forward, when backward inertia force acts on the seated occupant.

4 Claims, 12 Drawing Sheets

(56) References Cited

U.S. PATENT DOCUMENTS

| | | |
|---|---|---|
| 2013/0270878 A1 | 10/2013 | Adachi et al. |
| 2015/0123435 A1 | 5/2015 | Adachi et al. |
| 2015/0251571 A1 | 9/2015 | Adachi et al. |
| 2015/0367756 A1 | 12/2015 | Katoh et al. |
| 2016/0221482 A1 | 8/2016 | Adachi et al. |
| 2018/0147959 A1 | 5/2018 | Adachi et al. |
| 2019/0100121 A1 | 4/2019 | Adachi et al. |
| 2020/0139862 A1 | 5/2020 | Adachi et al. |

FOREIGN PATENT DOCUMENTS

| | | | | |
|---|---|---|---|---|
| EP | 2 657 071 A1 | | 10/2013 | |
| EP | 3023292 A1 | | 5/2016 | |
| EP | 3653432 A1 | | 5/2020 | |
| EP | 3736171 A1 | * | 11/2020 | ............. B60N 2/888 |
| JP | H07124035 A | | 5/1995 | |
| JP | 2003079473 A | * | 3/2003 | |
| JP | 2003135199 A | | 5/2003 | |
| JP | 2005028956 A | | 2/2005 | |
| JP | 2005287935 A | | 10/2005 | |
| JP | 2016005938 A | | 1/2016 | |
| JP | 2016016715 A | | 2/2016 | |
| JP | 2016538182 A | * | 12/2016 | |
| JP | 2019025993 A | | 2/2019 | |
| WO | 2012043807 A1 | | 4/2012 | |
| WO | WO-2013077437 A1 | * | 5/2013 | ............... B60N 2/66 |

OTHER PUBLICATIONS

International Search Report issued in PCT/JP2019/009239; dated May 14, 2019.

* cited by examiner

FIG.4
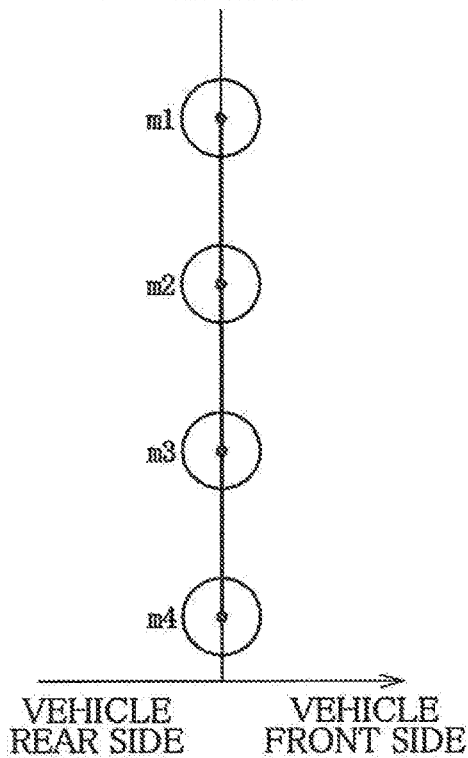
(a) BEFORE ACCELERATION IS GENERATED
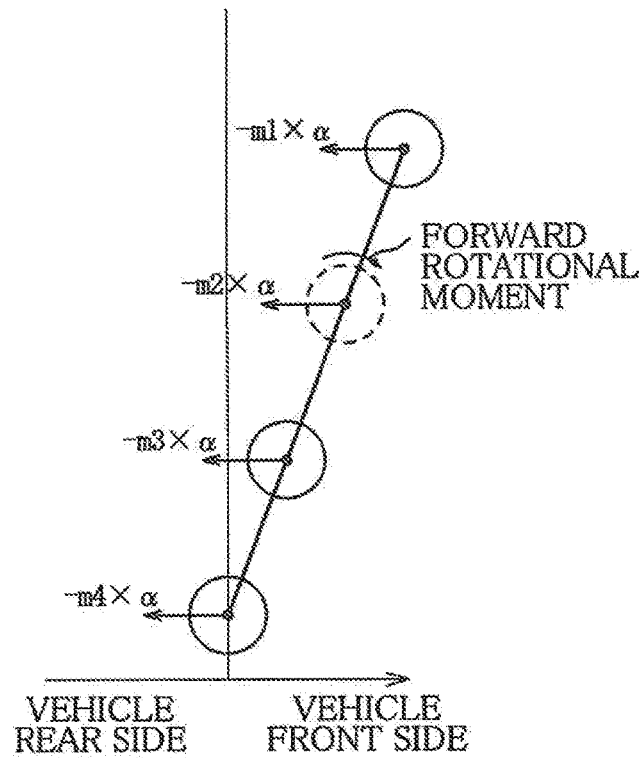
(b) AFTER ACCELERATION IS GENERATED FIG.10
(a)
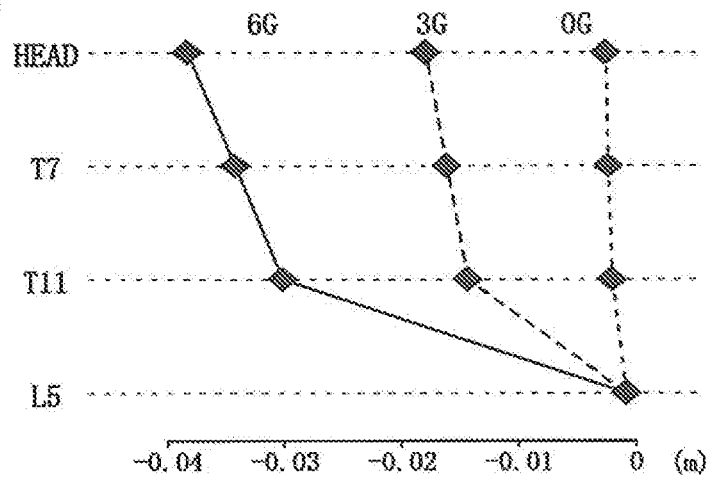
(b)
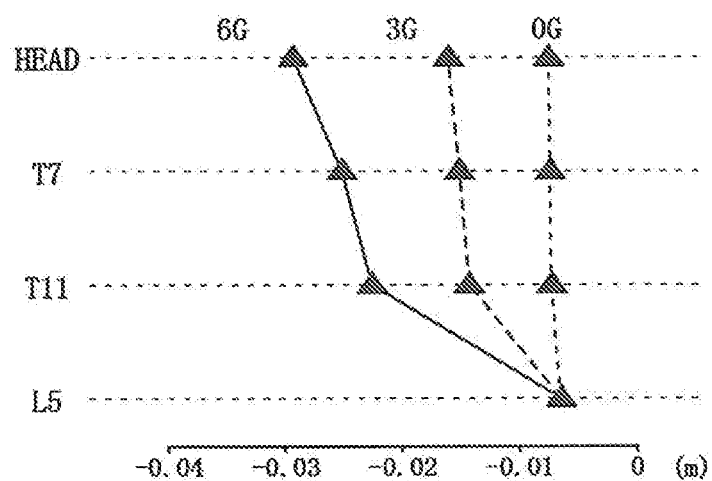
(c)
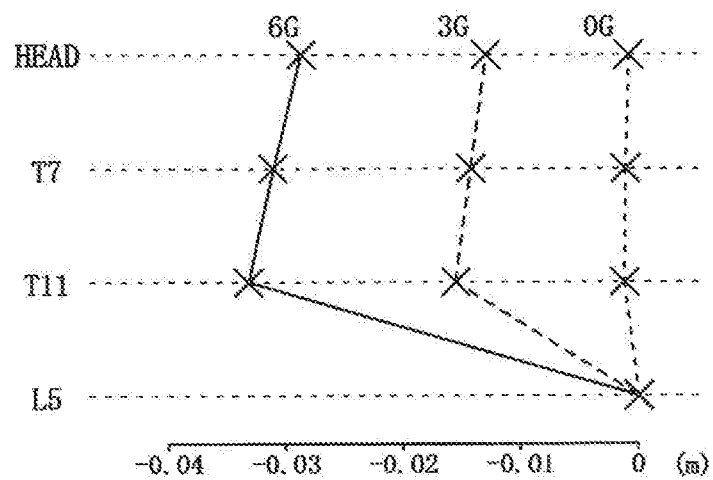

VEHICLE SEAT STRUCTURE

TECHNICAL FIELD

The present invention relates to a vehicle seat structure.

BACKGROUND ART

Conventionally, various techniques for improving a posture holding function of an occupant seated on a seat, so-called holdability, have been proposed in order to enhance operability of a vehicle, and, the like.

In a vehicle seat in Patent literature 1, a pair of left and right slopes (a left slope and a right slope) are filmed on a cushion pan in such a way that a height thereof increases outward in a seat width direction, and a reaction force acts on the left and right ischial bones of an occupant seated on the seat from both of the left slope and the right slope. By the reaction force acting on the left and right ischial bones, the pelvis of the seated occupant swinging in a left-right direction is returned toward the center of the seat cushion in a width direction thereof.

Further, a technique for securing holdability of a seat by supporting the thoracic spine and the lumbar spine of a seated occupant leaning against a seat back has also been proposed.

In a vehicle seat in Patent Literature 2, a center of rotation corresponding to the vicinity of the scapula of a seated occupant is set on a seat back frame, and a back rest portion for supporting the occupant's back is provided to be pivotally movable about the center of rotation set on the seat hack frame.

In the above configuration, the occupant is allowed to stretch the lateral muscles of his/her trunk on a side of a lateral force acting direction, and shrink the lateral muscles of his/her trunk on a side opposite to the lateral force acting direction. Consequently, holdability of the seat is improved.

The head of the occupant seated on a seat is supported on the seat via the spine (backbone) including the cervical, spine, the thoracic spine, and the lumbar spine.

The cervical spine includes first to seventh cervical vertebrae in this order from an upper side. The thoracic spine includes first to twelfth thoracic vertebrae in this order from an upper side. The lumbar spine includes first to fifth lumbar vertebrae in this order from an upper side. Generally, a section from the seventh cervical vertebra to the second thoracic vertebra is referred to as a cervical-thoracic transitional vertebrae, and a section from the tenth thoracic vertebra to the second lumbar vertebra is referred to as a thoracic-lumbar transitional vertebrae.

The spine (backbone) of a person in a walking state or a standing state has an S-shaped curve (spinal curve) in a side view. The S-shaped curve is referred to as physiological lordosis, and is formed in such a way that the cervical spine is inclined forward by about −10 to 30 degrees (4.7 degrees in average), the thoracic spine is inclined backward by about 5 to 45 degrees (24.1 degrees in average), and the lumbar spine is inclined forward by about 15 to 60 degrees (35.6 degrees in average).

As far as the physiological lordosis of an occupant similar to that in a walking state can be maintained in a seated state, it is conceived that incongruity of the occupant is reduced by minimizing the load of the intervertebral disc in the skeleton, and stress-free long-time traveling (vehicle driving) is enabled. In view of the above, forming the shape of a seat back into a shape aligned with the physiological lordosis has also been put into practice.

When a seat back is formed to align with the physiological lordosis as described, above, although the spinal curve of the occupant can be maintained during steady traveling of the vehicle or when the vehicle stops, the occupant may feel incongruity in a specific traveling state.

Among the spine dedicated to bending, stretching, and rotating, the thoracic spine whose main purpose is protecting the thoracic organs has a unique structure such that the thoracic spine comes into indirect contact with the sterna, the scapula, and the like, and has a small range of motion, In particular, the upper thoracic spine (first to seventh thoracic vertebrae) surrounded by the sterna, the scapula, and the like has a smallest range of motion, and, in other words, constitutes a most mechanically stabilized section.

When the vehicle is rapidly accelerated, the head of the occupant is inclined backward about the cervical-thoracic transitional vertebrae (specifically, the seventh cervical vertebra and the first thoracic vertebra) as a fulcrum, and the upper body of the occupant is inclined backward about a lower end (specifically, the seventh thoracic vertebra) of the upper thoracic spine as a fulcrum, Specifically, a posture of the occupant when the vehicle is rapidly accelerated is a warped posture such that the head is inclined backward greatly. Therefore, when the vehicle is traveling with acceleration, the occupant senses acceleration greater than actual acceleration of the vehicle, and may feel incongruity resulting from a discrepancy between his/her sensation, and an, actual behavior of the vehicle.

In order to suppress backward inclination of the upper body of the occupant during acceleration traveling of the vehicle, there is an idea of lowering a spring constant of a seat back so as to move a lower end of the upper thoracic spine backward in parallel, as the vehicle is accelerated.

However, lowering the spring constant of the seat back lowers holdability of the seat. In addition, backward inclination about the cervical-thoracic transitional vertebrae still remains by the presence of the head. Therefore, reducing incongruity is difficult Specifically, there is room for further improvement in order to reduce incongruity of the occupant, while securing holdability.

CITATION LIST

Patent Literature

Patent Literature 1: Japanese Unexamined Patent Application Publication No. 2016-016715
Patent Literature 2: Japanese Unexamined Patent Application Publication No. 2016-005938

SUMMARY OF INVENTION

An object of the present invention is to provide a vehicle seat structure capable of reducing incongruity of an occupant, while securing holdability.

As a configuration for achieving the above object, the present invention is directed to a vehicle seat structure provided with a seat cushion and a seat back. The seat hack includes: an upper thoracic support section for supporting at least a portion corresponding to a lower part of the upper thoracic spine of a seated occupant, and a lower thoracic support section disposed on a front side with respect to the upper thoracic support section and configured to support a portion corresponding to the lower thoracic spine of the seated occupant. The lower thoracic support section is configured, when backward inertia force acts on the seated occupant, to displace backward greatly, as compared with the upper thoracic support section according to the inertia, force in such a way that the upper thoracic spine of the seated occupant is inclined forward.

BRIEF DESCRIPTION OF DRAWINGS

FIG. 4 is a model diagram illustrating, a state of the upper body of the occupant before and after acceleration of the vehicle is generated.

FIG. 10 is a graph illustrating a result of an experiment performed to verify advantageous effects of the present invention.

DESCRIPTION OF EMBODIMENTS

In the following, preferred embodiments for carrying out the present invention are described with reference to the drawings. Description on the following preferred embodiments is merely and substantially an example, and does not intend to limit the scope of the present invention, an object of application thereof, or a use of application thereof.

First Embodiment

A first embodiment according to the present invention is described with reference to FIGS. 1 to 10.

Figure 1:
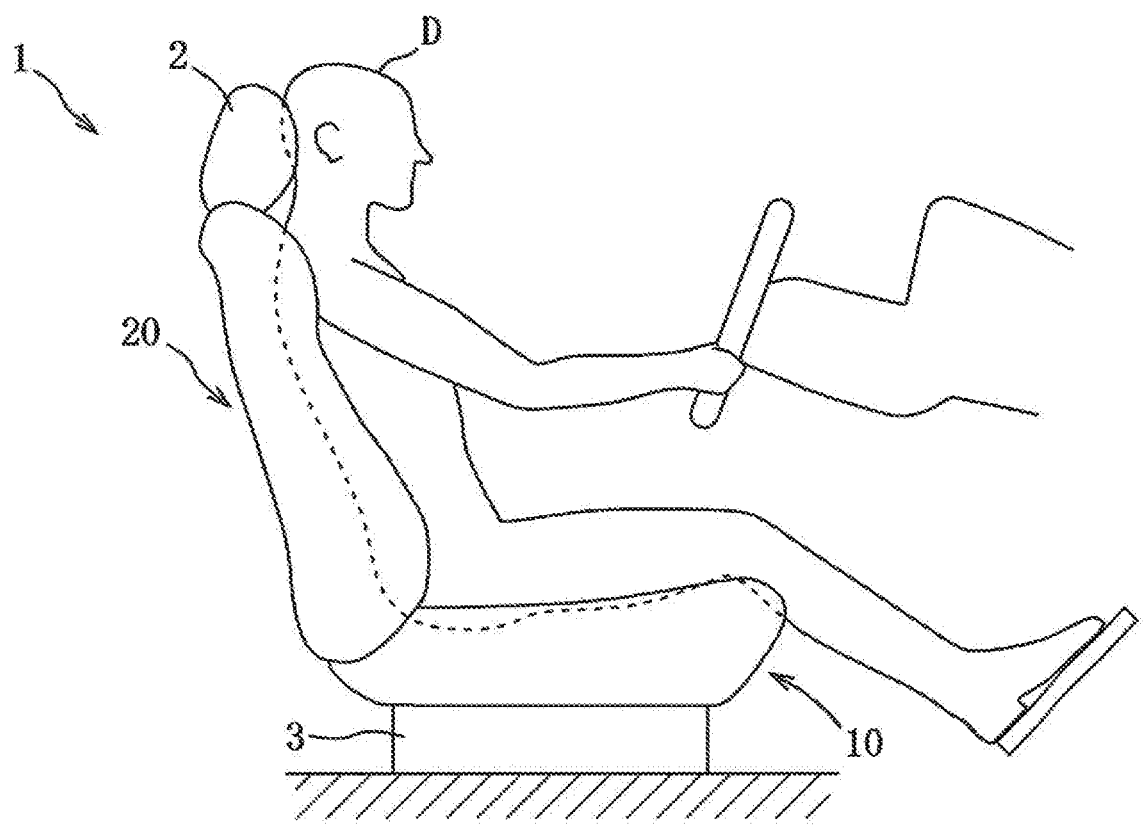
FIG. 1 is a schematic configuration diagram of a vehicle seat according to a first embodiment of the present invention.

As illustrated in FIG. 1, a vehicle seat 1 according to the first embodiment includes, as main constituent elements thereof, a head rest 2 for receiving the head of a seated occupant D, a leg mechanism 3 for fixing the seat 1 to a passenger compartment floor, a seat cushion 10 for supporting a part (buttock) corresponding to the ischial bone of the seated occupant D, and a seat back 20 for supporting a part (back) corresponding to the spine (backbone) of the seated occupant D.

In the following description, "front", "rear", "left", and "right" are described with respect to a seated occupant D seated on the vehicle seat 1 m a proper posture (posture illustrated in FIG. 1), and have the same definition as "front", "rear", "left", and "right" of a vehicle.

First, a basic idea of the present invention is described.

Figure 2:
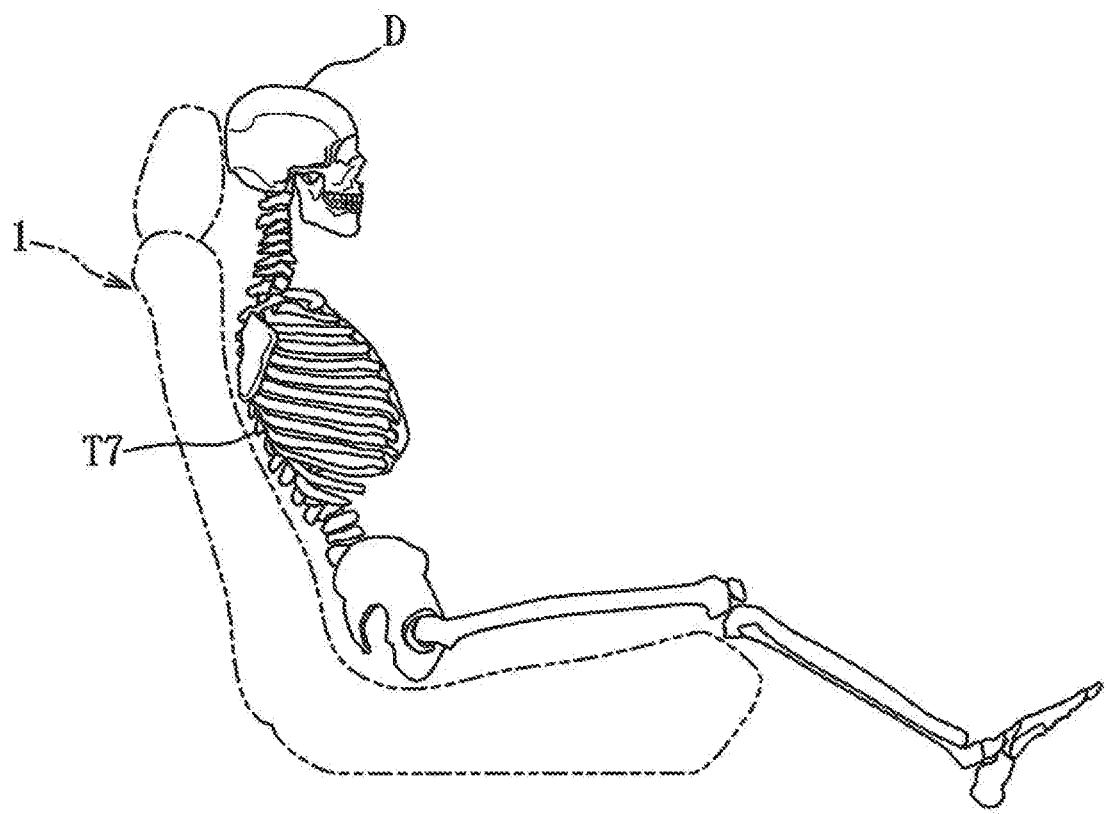
FIG. 2 is an explanatory diagram illustrating a skeletal structure of an occupant seated on the vehicle seat.

As illustrated in FIG. 2, the seat cushion 10 includes a front portion for supporting the femur from below, and a rear portion located on the rear side with respect to the front portion and configured to support the ischial bone from below.

The seat back 20 includes, a lower portion for supporting the hip bone (iliac bone, pubic bone, and ischial bone) and the lumbar spine from the rear side, a middle portion located on the upper side with respect to the lower portion and configured to support the lower thoracic spine from the rear side, and an upper portion located on the upper side with respect to the middle portion and configured to support the upper thoracic spine from the rear side.

In the present embodiment, for convenience of description, is assumed that the occupant D has the same size as an AM 50 (a human dummy equal to 50 percentile of an American male adult in size).

The spine of a human includes the first to seventh cervical vertebrae, the first to thoracic vertebrae, and the first to fifth lumbar vertebrae in this order from an upper side. The first cervical vertebra located at an uppermost position continues to the head. In the medical field, the first cervical vertebra, the second cervical vertebra, . . . , and the seventh cervical vertebra may be abbreviated as C1, C2, . . . , and C7; the first thoracic vertebra, the second thoracic vertebra, . . . , and the twelfth thoracic vertebra may be abbreviated as T1, T2, . . . , and T12; and the first lumbar vertebra, the second lumbar vertebra, and the fifth lumbar vertebra may be abbreviated as L1, L2, . . . , and L5. Therefore, in the following description, each part of the spine is indicated by the abbreviated name. For example, the first cervical C1, the first thoracic T1, the fast lumbar L1 are some of the abbreviated names.

In order to minimize the load of the intervertebral disc of the seated occupant D and enable long-time traveling, the seat back 20 of the vehicle seat 1 is formed in such a way that the cervical spine is inclined forward by about 20 degrees, the thoracic spine is inclined backward by about 20 to 40 degrees, and the lumbar spine is inclined, forward by about 35 to 60 degrees in a side view during steady traveling of the vehicle or when the vehicle stops, in other words, in such a way that the seat back 20 is formed to align with the physiological lordosis of the spine of the occupant.

Further, as illustrated in FIG. 2, for the purpose of eliminating constraint feeling (oppressive feeling) of the seated occupant D, the vehicle seat 1 is configured in such a way that a gap between the occupant D and the seat back 20 in a front-rear direction increases, as the seat back 20 extends upward in an upper region with respect to the seventh thoracic T7 being a lower end of the upper thoracic spine (first thoracic T1 to the seventh thoracic T7). The first thoracic T1 to the seventh thoracic T7 being, the upper thoracic spine constitute a section having a smallest range of motion among the, spine.

Figure 3:
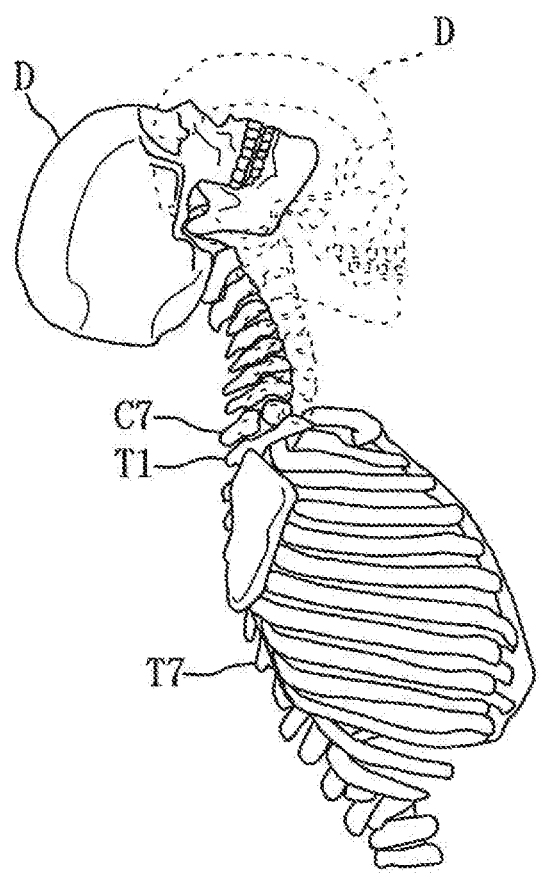
FIG. 3 is a diagram illustrating a state of the head of the occupant, when a vehicle is traveling with acceleration.

As indicated by the solid lines in FIG. 3, since backward, inertia force acts on the upper body of the occupant D during acceleration traveling of the vehicle, the upper body including the head is inclined backward about the seventh thoracic T7 being a lower end of the upper thoracic spine as a fulcrum. Further, since backward inertia force acts on the head, the head is inclined backward about the seventh cervical C7 and the first thoracic T1 being a cervical-thoracic transitional vertebrae as a fulcrum. The inertia force is an apparent force that appears, because the mass has inertia.

By the synergic effect of the above actions, the posture of the occupant D becomes a warped posture such that the head is inclined backward greatly. Since the occupant D senses acceleration greater than actual acceleration of the vehicle, the occupant D may feel incongruity resulting from a discrepancy between his/her sensation, and an actual behavior of the vehicle.

Further, when the vehicle makes a turn, backward inertia force acting on an outer part of the upper body, which is located on the outside of the turn becomes larger than backward inertia force acting on an inner part of the upper body, which is located on, the inside of the turn. Furthermore, a steering reaction force from a steering wheel acting on an arm located on the outside of the turn becomes larger than a steering reaction force from the steering wheel acting on an arm located on the inside of the turn.

By the synergic effect of the above actions, one of the left and right scapula corresponding to the outer part of the upper body in terms of turn, and its periphery (upper arm part located on the outside of the turn) are moved backward, while pushing against the seat back 20. This means that it is not possible to form, on the seat back 20, a support point of the upper arm part located on the outside of the turn. Thus, a smooth steering operation of the steering wheel may be impaired.

In view of the above, the inventors of the present application created a human dummy, as illustrated in the charts (a) and (b) of FIG. 4, in which the upper body including the head of the seated occupant D is divided into four sections corresponding to the head, the upper thoracic spine, the lower thoracic spine, and the lumbar spine; and studied motion of each section resulting from a forward, acceleration.

When it is assumed that the weight of the head is m1, the weight of the upper thoracic section is m2 (m1<m2), the weight of the lower thoracic section is m3 (m1<m3), the weight of the lumbar section is m4 (m3<m4), and a forward acceleration, of the vehicle is $\alpha$, it can be said that, as compared with a case before acceleration is generated (a, stationary state), after acceleration is generated, backward inertia forces expressed by $-m1 \times \alpha$, $-m2 \times \alpha$, $-m3 \times \alpha$, and $-m4 \times \alpha$ respectively act on the head, the upper thoracic spine, the lower thoracic spine, and the lumber spine.

In view of the above, in, the present embodiment, a backward movement adjustment mechanism capable of individually adjusting a backward movement amount of skeletal parts of the occupant D in the above-described sections is applied to the seat back 20. Although details will be described later, the backward movement adjustment mechanism is constituted by combination of a plurality of support sections (20a to 20e) of the seat back 20, which are formed in such a way that spring constants of the, support sections are made different from one another.

A first function of the backward movement adjustment mechanism is a head inclination suppressing function.

Figure 5:
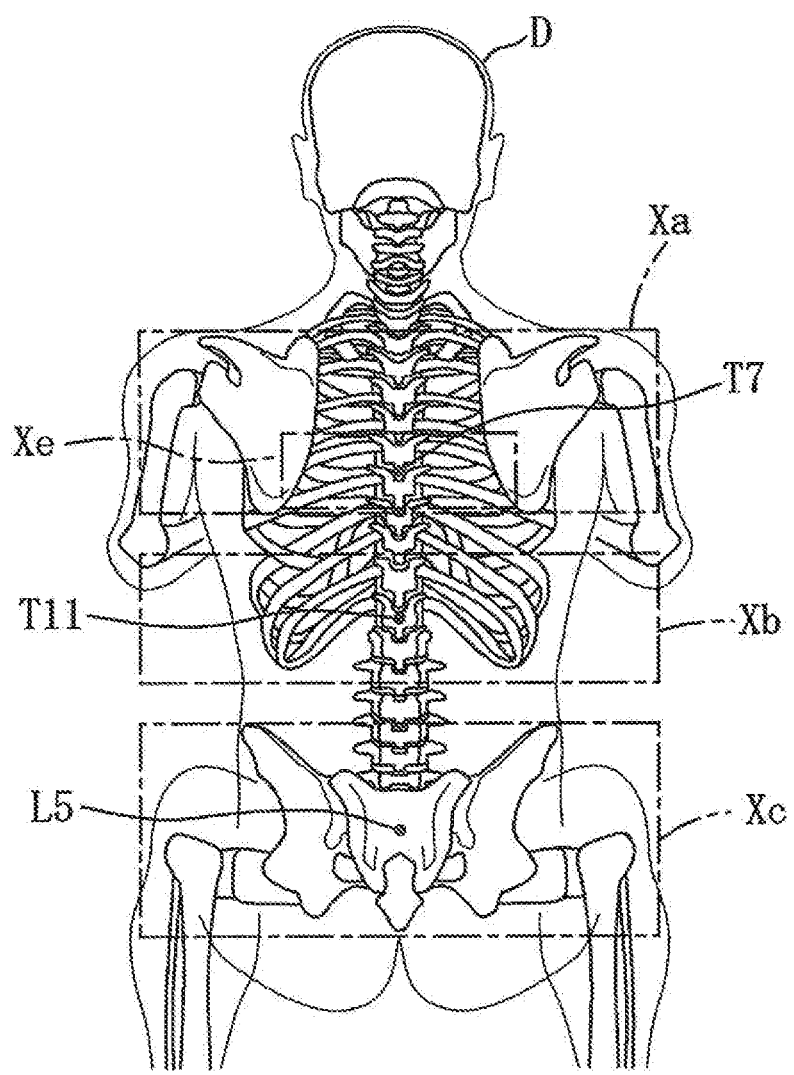
FIG. 5 is a rear view of the occupant's skeleton.

As illustrated in FIG. 5, the backward movement adjustment mechanism is configured in such a way that, when backward inertia force acts on the occupant D, a portion Xb corresponding to the lower thoracic spine including the eleventh thoracic T11 is moved backward greatly, as compared with a portion Xa corresponding to the upper thoracic spine including the seventh thoracic T7.

In this configuration, the upper thoracic spine is inclined forward, and a forward rotational moment (see FIG. 4) is imparted to the head of the occupant D. Then, by the imparted rotational moment, backward inclination of the head of the occupant D about the cervical-thoracic transitional vertebrae during acceleration traveling of the vehicle is suppressed. This is the head inclination suppressing function.

A second function of the backward movement adjustment mechanism is an upper arm support section forming function.

The backward movement adjustment mechanism is configured in such a way that, when backward inertia Rime acts on the occupant D, backward movement of the portion Xa corresponding to the upper thoracic spine is restrained greatly, as compared with backward movement of the portion Xb corresponding to the lower thoracic, spine, and backward movement of a portion Xc corresponding to the lumbar spine including the fifth lumbar L5.

The backward movement adjustment mechanism having a configuration as described above suppresses backward movement of the scapula located on the outside of the turn, and its periphery (upper arm part located on the outside of the turn) of the upper body of the occupant D, when the vehicle makes a turn. This means that a support point by which the upper arm part located on the outside of the turn is supported is formed on the seat back 20. Thus, an inertia force acting on the upper arm part located on the outside of the turn, and a steering reaction force from the steering wheel acting on the upper arm part are securely supported, and operability of the steering wheel is secured. This is the upper arm support section forming function.

Now, the description is returned to the vehicle seat 1.

Figure 6:
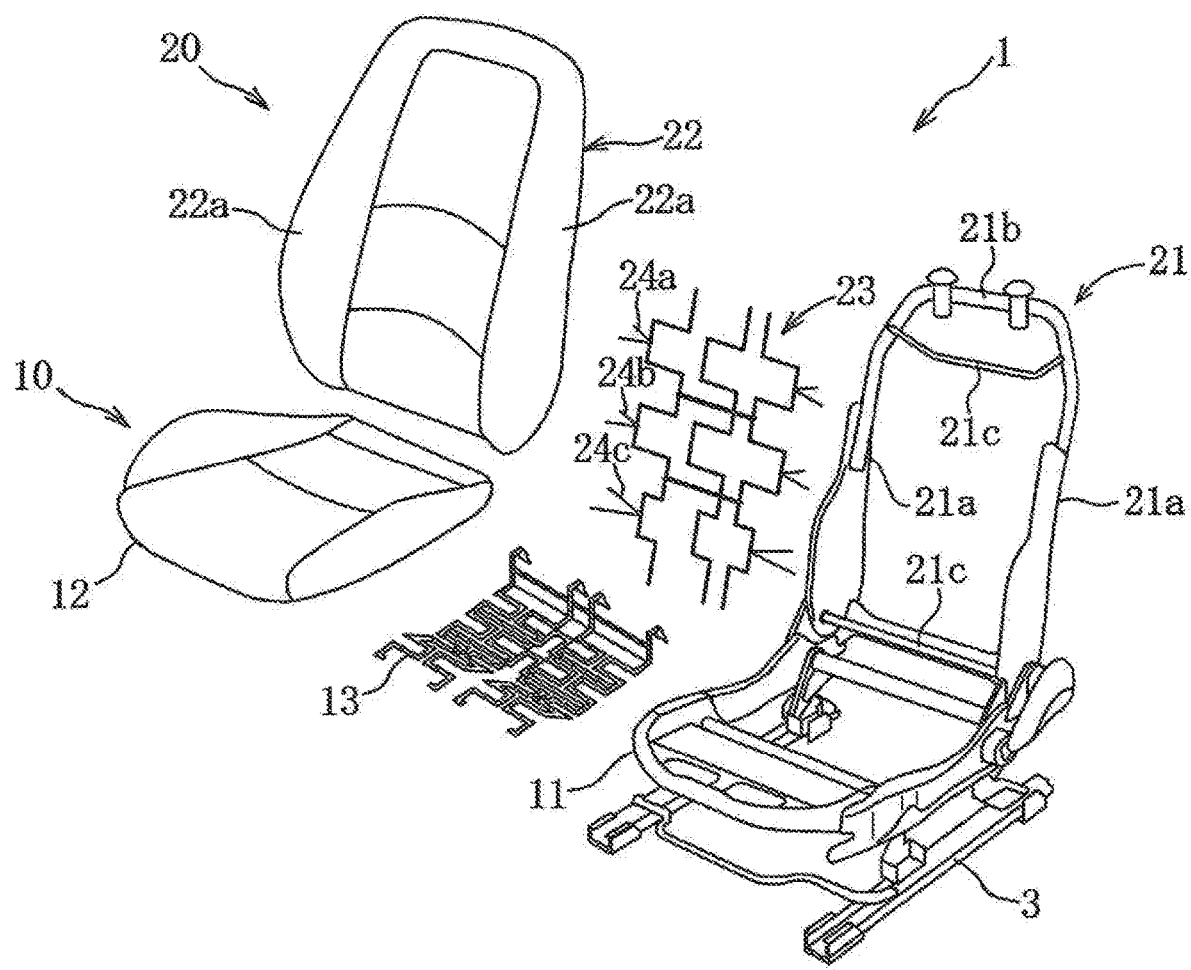
FIG. 6 is an exploded perspective view of the vehicle seat.

As illustrated in FIGS. 1 and 6, the leg mechanism 3 is directly fixed to a vehicle floor. A member for substantially imparting cushion property is not disposed between the leg mechanism 3 and the floor.

The leg mechanism 3 includes a sliding mechanism for slidably supporting the seat cushion 10 and the seat back 20 in the front-rear direction with respect to the floor. The sliding mechanism has a function of moving the vehicle seat 1 in the front-rear direction, and function of holding the vehicle seat 1 at a position desired by the occupant D.

In the following, description is made based on a premise that a state of the vehicle seat 1 is a an initial state in which a mechanism for performing posture adjustment such as lifting, tilting, and reclining is not operated at all.

As illustrated in FIG. 6, the seat cushion 10 includes a metal frame member 11 for imparting a structural strength to the seat cushion 10, a polyurethane cushion member 12 a metal elastic member 13, and an outer cover member for covering these elements 11 to 13.

The frame ember 11 is a strength member having a substantially U-shape in a plan view; and includes a pair of left and right, lateral frame portions extending in the front-rear direction, and a front frame portion for connecting front. ends of the lateral frame portions to each other.

The elastic member 13 includes a plurality of metal plate springs. The elastic member 13 is mounted in such a way that the elastic member 13 is elastically deformable in an up-down direction inside the seat cushion 10 by fixation of front and rear ends of the elastic member 13 to the frame member 11. When the occupant D is seated, the elastic member 13 supports the buttock of the occupant D from below, while causing downward elastic deformation.

The cushion member 12 is supported by the frame member 11 and the elastic member 13, and is disposed to cover the frame member 11 and the elastic member 13. The cushion member 12 has elastic deformation characteristics (spring characteristics) and vibration damping characteristics. When the occupant D is seated, the cushion member 12 supports the buttock of the occupant D in cooperation with the elastic member 13, while causing compression deformation. The cushion member 12 which has undergone compression deformation recovers to the original shape, as the occupant D leaves the seat.

As illustrated in FIGS. 6 to 9, the seat back 20 includes a metal frame member 21 for imparting a structural strength to the seat back 20, a polyurethane cushion member 22, a metal elastic member 23, and an outer cover member for covering these elements 21, 22, and 23.

The frame member 21 is a strength member having a substantially U-shape in a front view; and includes a pair of left and right lateral frame portions 21a extending obliquely upward from a rear end of the frame member 1 for the seat cushion 10, and an upper frame portion 21b for connecting upper ends of the lateral frame portions 21a to each other. A pair of upper and lower hooked bars 21c are formed at a height position slightly lower than the upper frame portion 21b, and at a height position near a lower end of the frame member 21 to connect the lateral frame portions 21a to each other in a left-right direction.

The elastic member 23 includes a plurality of (e.g. three) S-springs 23 a to 23c (particularly, see FIG. 9) made of metal wires and extending in the up-down direction. The elastic member 23 is mounted in such a way that the elastic member 23 is elastically deformable in the front-rear direction inside the seat back 20 by fixation of upper and lower ends of each of the S-springs 23a to 23c to the upper and lower hooked bars 21c of the frame member 21.

Figure 7:
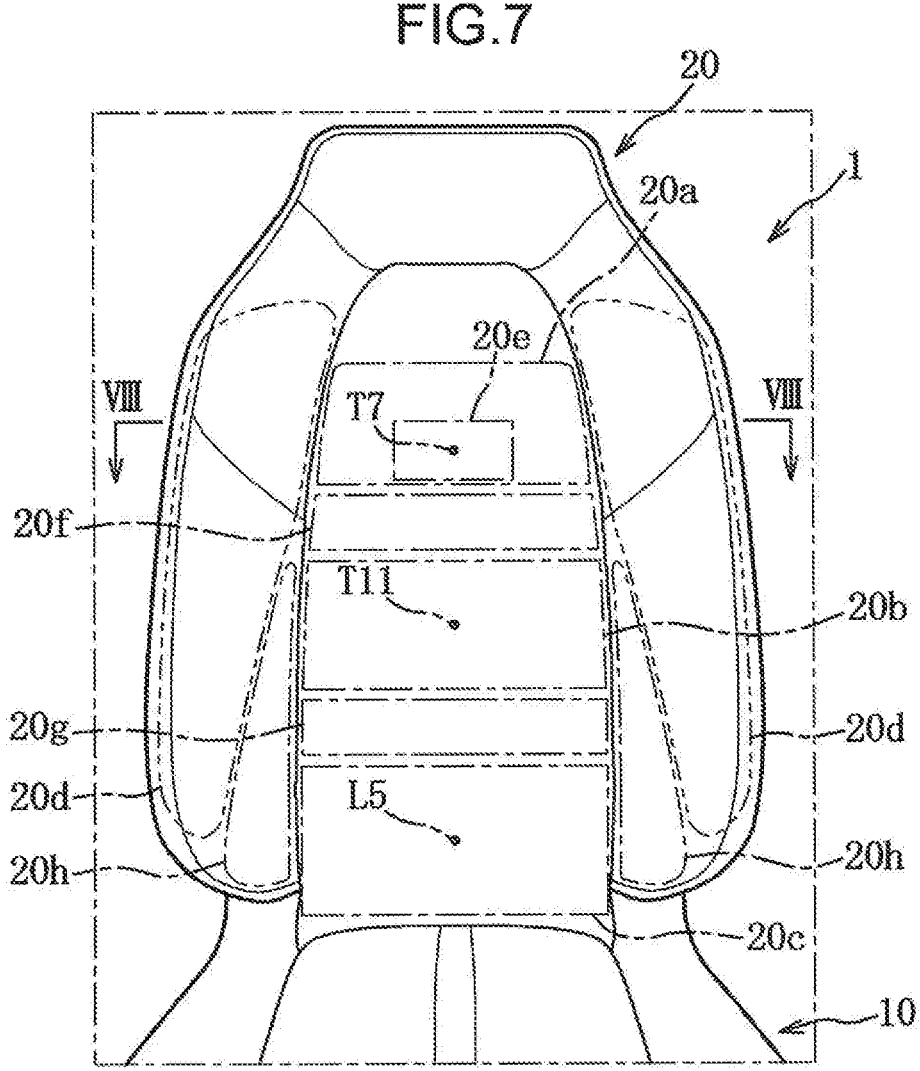
FIG. 7 is a front view of a seat back.
Figure 8:
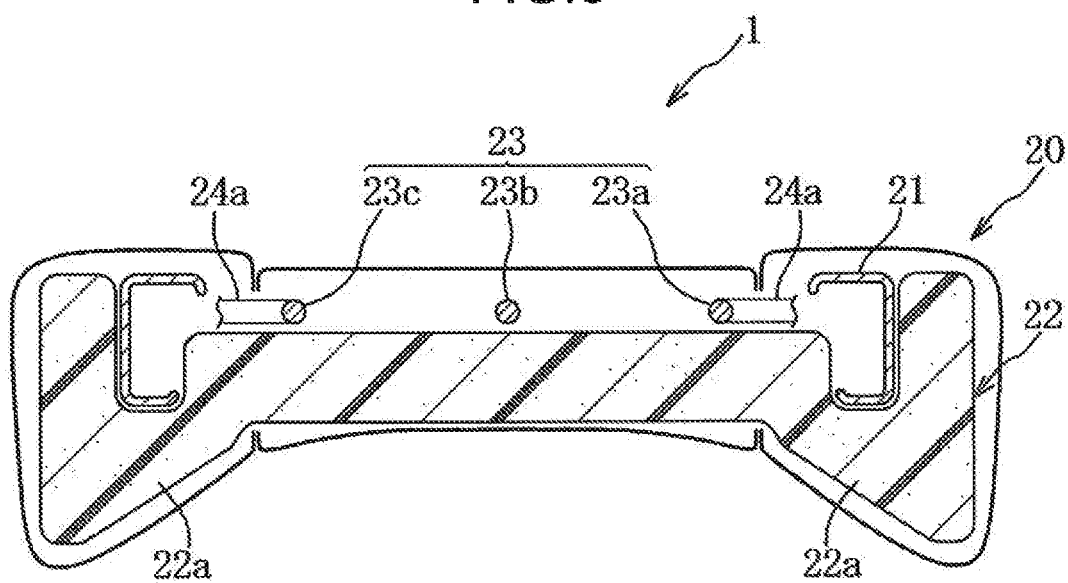
FIG. 8 is a cross-sectional view taken along the line VIII-VIII in FIG. 7.

As illustrated in FIGS. 6 to 8, the cushion member 22 includes, on left and right peripheries, outer edge portions 22a, each of which protrudes forward with respect to a middle portion thereof. The cushion member 22 is disposed on the front side of the elastic member 23, and, is supported on the frame member 21 in a state that the cushion member 22 partially covers the frame member 21. The cushion member 22 has elastic deformation characteristics (spring characteristics) and vibration damping characteristics.

As illustrated in FIG. 7, the seat back 20 includes, in a front view, a substantially rectangular-damped upper thoracic support section 20a for supporting the portion Xa corresponding to the upper thoracic spine(T1 to T7); a substantially rectangular-shaped lower thoracic support section 20b disposed on the lower side with respect to the upper thoracic support section 20a, and configured to support the portion Xb corresponding to the lower thoracic spine (T8 to T12); a substantially rectangular-shaped lumbar support section 20c disposed on the lower side with respect to the lower thoracic support section 20b, and configured to support the portion Xc corresponding to the lumbar spine (L1 to L5); and a pair of left and right vertically extending outer edge support sections 20d disposed on the outer sides of each of the support sections 20a to 20c in the seat width direction. The seat back 20 is disposed, in an initial state, in a posture such that the seat back 20 is slightly inclined backward (reclined) about a lower end thereof. Therefore, the lower thoracic support section 20b is located on the front side with respect to the upper thoracic support section 20a, and the lumbar support section 20c is located on the front side with respect to the lower thoracic support section 20b.

When it is assumed that spring constants of the upper thoracic support section 20a, the lower thoracic support section 20b, the lumbar support section 20c, and the outer edge support section 20d are ka, kb, kc, and kd (N/m), the support sections 20a to 20d are configured to satisfy the following formula (1a), $$kb<kc\leq ka<kd \quad (1a)$$

A low spring constant means that a member having such a low spring constant is easily deformed by application of an external force. Specifically, when backward inertia force acts on the occupant D, a support section having a low spring constant is displaced (deformed) backward greatly, as compared with a support section having a high spring constant. According to the above formula (1a) a backward displacement amount of the lower thoracic support section 20b having the smallest spring constant kb is largest. Conversely, a backward displacement amount of a support section having a high spring constant (e.g. the outer edge support section 20d having the largest spring constant kd) is small. In other words, a support section having a high spring constant forms a backward movement restriction area for restricting backward movement of a corresponding skeletal part of the occupant D.

The upper thoracic support section 20a includes, in an inner area thereof, a tower end support section 20e for supporting a proximal section of the seventh thoracic T7 being a lower end of the upper thoracic spine. More specifically, the lower end support section 20e is formed in an area close to a lower end of a middle portion of the upper thoracic support section 20a in the seat width direction in order to support the seventh thoracic T7 and its periphery. Left and right ends of the lower end support section 20e respectively face the left and right scapular areas of the occupant D.

When it is assumed that a spring constant of the lower end support section 20e of the upper thoracic support section 20a is ke, and a spring constant of a part of the upper thoracic support section 20a other than the lower cud support section 20e is ka', a relationship expressed by the following formula (2) is established between the two parameters.

$$10 \leq ka'31\ ke \quad (2)$$

As expressed by the above formula (2), the upper thoracic support section 20a is configured in such a way that the spring constant ke of the lower end support section 20e (lower middle part) is smaller than the spring constant ka' of the other part. This means that, when backward inertia force acts on the occupant D, the lower end support section 20e is displaced backward relatively greatly. Thus, since an amount of depression formed in the lower end support section 20e becomes slightly larger than that in the periphery thereof, the depressed lower end support section 20e exhibits a function of positioning the seventh thoracic T7 on the seat back 20, and holdability of the seat is enhanced.

When the above formula (2) is applied to the above formula (1a), the formula (1a) is rewritten into the following formula (1).

$$kb<kc\leq ke<ka'<kd \quad (1)$$

In the present embodiment, it is assumed that the, spring constant ke of the lower end support section 20e of the upper thoracic support section 20a is substantially equal to the spring constant kc of the lumbar support section 20c (equal to or slightly larger than kc).

Further, the spring constant ke of the lower end support section 20e is set to satisfy the condition expressed by the following formula (3) in relation to the spring constant kb of the lower thoracic support section 20b.

$$20 \leq ke-kb$$

$$5/4 \leq ke/kb \leq 7/4 \quad (3)$$

Thus, it is possible to securely suppress the head of the occupant D from inclining backward about the cervical-thoracic transitional vertebrae (C7 and T1) during acceleration traveling of the vehicle.

As illustrated in FIG. 7, a substantially rectangular-shaped upper middle support section 20f is formed between the upper thoracic support section 20a and the lower thoracic support section 20b. A substantially rectangular-shaped lower middle support section 20g is former between the lower thoracic support section 20b and the lumbar support section 20c. A pair of left and right substantially triangularshaped intermediate support sections 20h are formed between the lower thoracic support potion 20b, the lower middle support section 20g, and the lumbar support section 20c; and the left and right outer edge support sections 20d.

When it is assumed that a spring ant of the upper middle support section 20f and a spring constant of the lower middle support section 20g are respectively kf and kg, the support sections 20f and 20g are configured to satisfy the condition expressed by the following formula (4).

$$kb < kf < ka$$

$$kb < kg < kc \qquad (4)$$

In the formula (4), kf<ka indicates that the spring constant kf of the upper middle support section 20f is smaller than both of the spring constant ke of the lower end support section 20e of the upper thoracic support section 20a, and the spring constant ka' of the part of the upper thoracic support section 20a other than the lower end support section 20e.

The above formula (4) indicates that the spring constant kf of the upper middle support section 20f is set to an intermediate value of the spring constants ka and kb of the support sections (the upper thoracic support section 20a and the lower thoracic support section 20b) on the upper side and the lower side of the upper middle support section 20f, and the spring constant kg of the lower middle support section 20g is set to an intermediate value of the spring constants kb and kc of the support sections (the lower thoracic support section 20b and the lumbar support section 20c) on the upper side and the lower side of the lower middle support section 20g. Thus, a change in spring constant becomes moderate in an area from the upper thoracic support section 20a to the lumbar support section 20c of the seat back 20, and incongruity of the occupant is reduced. Further, since spring characteristics of the seat back 20 are set to arc-shaped characteristics such that the spring characteristics are substantially and vertically symmetrical with respect to the eleventh thoracic T11, which corresponds to the pit of the stomach, hold ability is secured, regardless of a difference in physical constitution to some extent, and incongruity of the occupant is reduced also in this sense.

The paired left and right intermediate support sections 20h are formed in such a way that the apices thereof are substantially coincide with the height of the eleventh thoracic T11. Each of the intermediate support sections 20h is formed in such a way that a widthwise size thereof increases, as the intermediate support section 20h extends downward.

When it is assumed that a spring constant of the intermediate support section 20h is kh, the intermediate support section 20h is configured to satisfy the condition expressed by the following formula (5).

$$kc < kh < kd \qquad (5)$$

Herein, it can be said that the frame member 21, the cushion member 22, and the elastic member 23 are a single spring structure having certain spring characteristics (elastic deformation characteristics). The spring constants ka (ka', ke), kb, kc, kd, kf, kg, and kh of the support sections 20a to 20h are calculated under an assumption that the single spring structure supports the occupant D. Specifically, a structure model configured in such a way that the single spring structure supports the weights of the sections (the upper thoracic section, the lower thoracic section, the lumbar section, and the like) of the occupant D corresponding to the support sections 20a to 20h is generated, and the spring constants ka to kb of the support sections 20a to 20h are calculated by using the generated structure model.

Regarding concrete calculation of the spring constants, since there are various methods including the one described in the patent application (e.g. Japanese Patent Application No. 2017-145340) filed by the applicant of the present application, detailed description thereof is omitted.

In the present embodiment, it is assumed that a spring constant is substantially fixed in each of the support sections. For example, the lower end support section 20e of the upper thoracic support section 20a has a substantially same spring constant in any of the positions thereon (a representative value among the values is ke). The part of the upper thoracic support section 20a other than the lower end support section 20e has a substantially same spring constant in any of the positions thereon (a representative value among the values is ka'). Further, the lower thoracic support section 20b has a substantially same spring constant in any of the positions thereon (a representative value among the values is kb). This idea is also applied to the lumbar support section 20e, the outer edge support sections 20d, the upper middle support section 20f, the lower middle support section 20g, and the intermediate support sections 20h.

Figure 9:
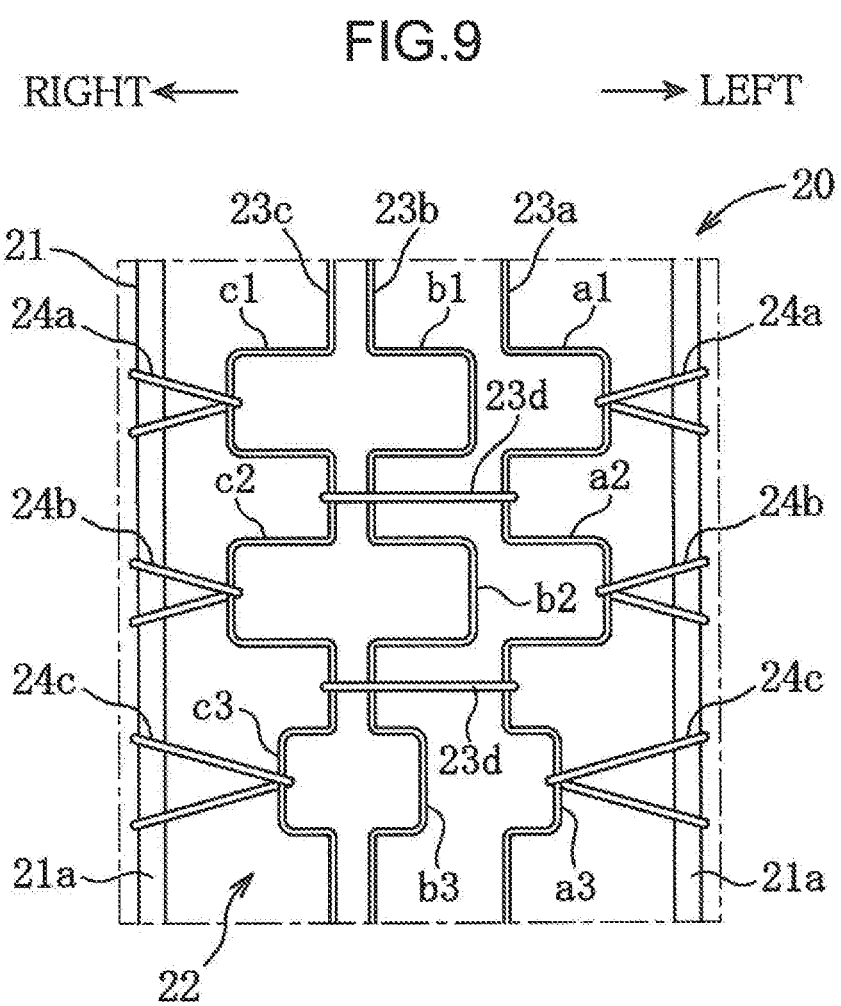
FIG. 9 is a partial rear view of the seat. back in a state that illustration of an outer cover member is omitted.

As illustrated in FIG. 9, the S-springs 23a to 23c of the elastic member 23 are fixed to the left and right lateral frame portions 21a of the frame member 21 via a plurality of connecting members 24a to 24c. Further, upper and lower ends of each of the S-springs 23a to 23c are fixed to the upper and lower hooked bars 21c of the frame member 21. The S-springs 23a to 23c are arranged in this order from the left side. Hereinafter, the S-springs 23a to 23c are referred to as the left S-spring 23a, the middle S-spring 23b, and the right S-spring 23c, as necessary.

The connecting members 24a to 24c are provided at positions corresponding to the support sections 20a to 20c (positions overlapping with the support sections 20a to 20c in a front view). In order to make the spring constants ka to kc of the support sections 20a to 20c different from one another, tension forces of the connecting members 24a to 24c are set to be different from one another.

The left S-spring 23a includes a plurality of bulging portions a1 to a3 bulging leftward (toward the left outer edge support, section 20d) at height positions respectively corresponding to the upper thoracic support section 20a, the lower thoracic support section 20b, and the lumbar support section 20c.

The middle S-spring 23b has a shape similar to the left S-spring 23a Specifically, the middle S-spring 23b includes a plurality of bulging portions b1 to b3 bulging leftward (toward the left outer edge support section 20d) at height positions respectively corresponding to the upper thoracic support section 20a, the lower thoracic support section 20b, and the lumbar support section 20c.

The right S-spring 23c is formed to be symmetrical in the left-right direction with respect to the middle S-spring 23b (or the left S-spring 23a). Specifically, the right S-spring 23c includes bulging portions c1 to c3 bulging rightward (toward the right outer edge support section 20d) at height positions respectively corresponding to the upper thoracic support section 20a, the lower thoracic support section 20b, and the lumbar support section 20c.

The paired left and right connecting members 24a connect upper portions of the left and right S-springs 23a and 23c to side portions of the frame member 21. Specifically, the left connecting member 24a connects the bulging portion a1 of the left S-spring 23a corresponding to the upper thoracic support section 20a, and an intermediate upper portion of the left lateral frame portion 21a of the frame member 21. Likewise, the right connecting member 24a connects the bulging portion c1 of the right S-spring 23c corresponding to the upper thoracic support section 20a, and an intermediate upper portion of the right lateral frame portion 21a of the frame member 21.

The paired left and right connecting members 24b connect middle portions of the left and right S-springs 23a and 23c to side portions of the frame member 21. Specifically, the left connecting member 24b connects the bulging portion a2 of the left S-spring 23a corresponding to the lower thoracic support section 20b, and an intermediate middle portion of the left lateral frame portion 21a of the frame member 21. Likewise, the right connecting member 24b connects the bulging portion c2 of the right S-spring 23c corresponding to the lower thoracic support section 20b, and an intermediate middle portion of the right lateral frame portion 21a of the frame member 21.

The paired left and right connecting members 24c connect lower portions of the left and right S-springs 23a and 23c to side portions of the frame member 21. Specifically, the left connecting member 24c connects the bulging portion a3 of the left S-spring 23a corresponding to the lumbar support section 20c, and an intermediate lower portion of the left lateral frame portion 21a of the frame member 21. Likewise, the right connecting member 24c connects the bulging portion e3 of the right S-spring 23c corresponding to the lumbar support section 20c, and an intermediate lower portion of the right lateral frame portion 21a of the frame member 21.

As illustrated in FIG. 9, the S-springs 23a to 23c are bound via a pair of upper and lower binding members 33d at height positions respectively corresponding to the upper middle support section 20f (between the upper thoracic support section 20a and the lower thoracic support section 20b), and the lower middle support section 20g (between the lower thoracic support section 20b and the lumbar support section 20c). Specifically, the upper binding member 23d binds a portion between the bulging portions a1 and a2. of the left S-spring 23a, a portion between the bulging portions b1 and b2 of the middle S-spring 23b, and a portion between the bulging portions c1 and c2 of the right S-spring 23c. Likewise, the lower binding member 23d binds a portion between the bulging portions a2 and a3 of the left S-spring 23a, a portion between the bulging portions b2 and b3 of the middle S-spring 23b, and a portion between the bulging portions c2 and c3 of the right S-spring 23c.

Connecting tension forces of the connecting members 24a to 24c are adjusted to satisfy the conditions expressed by the formulas (1) to (4).

The spring constants of the lower end support section 20e of the upper thoracic support section 20a, the upper middle support section 20f, and the lower middle support section 20g are adjusted by changing spring characteristics of the cushion member 22, in addition to adjustment of the connecting tension forces by the connecting members 24a to 24c.

Next, operations and advantageous effects of the vehicle seat 1 are described.

In order to verify the operations and advantageous effects, an experiment by computer assisted engineering (CAE) was performed. In the verification experiment, comparative models M1 and M2, and a present embodiment model M3 were prepared, and backward displacement amounts of the head, the seventh thoracic T7, and the eleventh thoracic T11, when two types of accelerations (3G and 6G) act, were calculated with reference to the fifth lumbar L5. The seventh thoracic T7 corresponds to the shoulder positions of the occupant D, and the eleventh thoracic T11 corresponds to the waist position of the occupant D.

The present embodiment model M3 is a model in which spring constants of the lower end support section 20e of the upper thoracic support section 20a, the part of the upper thoracic support section 20a other than the lower end support section 20e, and the lower thoracic support section 20b are set to ke, ka', and kb defined by the formulas (1) to (3).

The comparative model M1 is a model in which a spring constant of the upper thoracic support section 20a (the lower end support section 20e, and the part other than the lower end support section 20e) is set equal to the spring constant kb of the lower thoracic support section 20b of the present embodiment model M3, and a spring constant of the lower thoracic support section 20b is set equal to the spring constant ke of the lower end support section 20e of the present embodiment model M3. In the comparative model M1, when it is assumed that a spring constant of the lower end support section 20e of the upper thoracic support section 20a is ke1, a spring constant of the part of the upper thoracic support section 20a other than the lower end support section 20e is ka1', and a spring constant of the lower thoracic support section 28b is kb1, a magnitude relationship among these spring constants is expressed by the following formula (6).

$$ke1 = ka1' < kb1 \quad (6)$$

The comparative model M2 is a model in which both of a spring constant of the upper thoracic support section 20a (the lower end support section 20e and the part other than the lower end support section 20e), and a spring constant of the lower thoracic support section 20b are set to about two times of the spring constant ke of the lower end support section 20e of the present embodiment model M3. Specifically, in the comparative model M2, when it is assumed that a spring constant of the lower end support section 20e of the upper thoracic support section 20a is ke2, a spring constant of the part of the upper thoracic support section 20a other than the lower end support section 20e is ka2', and a spring constant of the lower thoracic support section 20b is kb2, a magnitude relationship among these spring constants is expressed by the following formula (7).

$$ke2 = ka2 = kb2 \quad (7)$$

In the following a verification result is described pit reference to charts (a) to (c) in FIG. 10.

As illustrated in the chart (a) of FIG. 10, in the comparative model M1, it is clear that the head of the occupant D is inclined backward significantly greatly (an amount of backward inclination is excessively large), since a backward movement amount of the spine increases, as the spine extends upward with respect to the fifth lumbar L5. Further, it is clear that a backward movement amount of the seventh thoracic T7 is large, and a support point by which the scapula and its periphery (scapular areas) are supported is not sufficiently formed.

As illustrated in the chart (b) of FIG. 10, in the comparative model M2, it is clear that, although an amount of backward inclination is small, as compared with the comparative model M1, backward inclination of the head of the occupant D is not sufficiently suppressed, since there is a tendency such that a backward movement amount of the spine increases, as the spine extends upward with respect to the fifth lumbar L5. Further, although a backward movement amount of the seventh thoracic T7 is suppressed, as compared with the comparative model M1, since a depression amount (displacement amount) of each of the support sections is small, it is difficult to secure seating comfort, and it is difficult to secure holdability of holding the posture of the occupant D, when the vehicle makes a turn.

As illustrated in the chart (c) of FIG. 10, in the present embodiment model M3 as the acceleration increases, a tendency (forward inclination tendency) such that a backward movement amount of the spine decreases, as the spine extends upward in a section on the upper side with respect to the eleventh thoracic T11, becomes conspicuous. Specifically, a forward rotational moment is imparted to the head of the occupant D, and the backward inclination of the head is suppressed. Further, as expressed by the formula (2), the spring, constant ke of the lower end support section 20e, which is formed at a position directly corresponding to the seventh thoracic T7 (a position overlapping with the seventh thoracic T7 in a front view) is smaller than the spring constant ka' of left and right areas of the lower end support section 20e (the part of the upper thoracic support section 20a other than the lower end support section 20e). In other words, the seat back 20 is configured to substantially support the, scapular areas at positions displaced in the left right direction from the seventh thoracic T7. Thus, it is less likely that the occupant D feels pain by being pressed, even when the seventh thoracic T7 is moved backward.

As described above, the seat back 20 of the vehicle seat 1 according to the first embodiment includes the upper thoracic support section 20a for supporting at least the portion Xa corresponding to the upper thoracic spine including the seventh thoracic T7 (lower part of the upper thoracic spine) of the seated occupant D, and the lower thoracic support section 20b disposed on the front side with respect to the upper thoracic support section 20a and configured to support the portion Xb corresponding to the lower thoracic spine of the seated occupant D. Therefore, it is possible to individually set support characteristics of the upper thoracic support section 20a and the lower thoracic support section 20b. Further, when backward inertia force acts on, the seated occupant D, it is possible to displace the lower thoracic support section 20b backward greatly, as compared with the upper thoracic support section 20a, Therefore, it is possible to generate a rotational moment in such a direction as to incline the upper thoracic spine forward, and it is possible to suppress the head of the, seated occupant D from inclining backward. Specifically, by the forward rotational moment, it is possible to suppress the head of the occupant D from inclining backward about the cervical-thoracic transitional vertebrae, and maintain the physiological lordosis of the seated occupant D during acceleration traveling of the vehicle.

The seat back 20 according to the first embodiment further includes the lumbar support section 20c disposed on the front side with respect to the lower thoracic support section 20b and configured to support the portion Xc corresponding to the lumbar spine of the seated occupant D. Therefore, it is possible to individually set support characteristics of the lumbar support section 20c, in addition to the upper thoracic support section 20a and the lower thoracic support section 20b. Further, when backward inertia force acts on the seated occupant D, it is possible to displace the lower thoracic support section 20b backward greatly, as compared with the lumbar support section 20c. Therefore, it is possible to maintain the physiological lordosis of the seated occupant D without depending on a behavior of the vehicle.

In the first embodiment, the spring constant kb of the lower thoracic support section 20b is lower than the spring constant ka (ka', ke) of the upper thoracic support section 20a, and the spring constant kc of the lumbar support section 20c. Therefore, it is possible to displace the lower thoracic support section 20b backward greatly, as compared with the upper thoracic support section 20a and the lumbar support section 20c with a simplified configuration.

The seat back 20 according to the first embodiment further includes the upper middle support section 20f disposed between the upper thoracic support section 20a and the lower thoracic support section 20b, and the lower middle support section 20g disposed between the lower thoracic support section 20b and the, lumbar support section 20c. The spring constant kf of the upper middle support section 20f is set to an intermediate value between the spring constant ka of the upper thoracic support section 20a, and the spring constant kb of the lower thoracic support section 20b. The spring constant kg of the lower middle support section 20g is set to an intermediate value between the spring constant kb of the lower thoracic support section 20b and the spring constant kc of the lumbar support section 20c. Therefore, it is possible to reduce incongruity of the occupant D by moderating a change in spring constant. Further, since spring characteristics of the seat back 20 are set to arc-shaped characteristics such that the spring characteristics are substantially and vertically symmetrical with respect to the lower thoracic support section 20b, ft is possible to reduce incongruity of the occupant D, while securing holdability, regardless of a difference in physical constitution to some extent.

In the first embodiment, since the spring constant ke of the lower end support section 20e of the upper thoracic support section 20a is set substantially equal to the spring constant kc of the lumbar support section 20c, it is possible to impart to the seat back 20, support characteristics symmetrical with respect to the lower thoracic support section 20b.

In the first embodiment, since the spring constant ke of the lower end support section 20e of the upper thoracic support section 20a is larger than the spring constant kb of the lower thoracic support section 20b by 20 N/m or more, it is possible to securely suppress the head of the occupant D from inclining backward about the cervical-thoracic transitional vertebrae during acceleration traveling of the vehicle.

In the first embodiment, since the spring constant ke of the lower end support section 20e of the upper thoracic support section 20a is set in a range from 5/4 to 7/4 of the spring constant kb of the lower thoracic support section 20b, it is possible to securely suppress the head of the occupant D from inclining backward about the cervical-thoracic transitional vertebrae during acceleration traveling of the vehicle, while securing comfort of the occupant D.

Second Embodiment

Next, a vehicle seat 1A according to a second embodiment of the present invention is described with reference o FIGS. 11 and 12.

A main difference between the first embodiment and the second embodiment is that, whereas, in the first embodiment, the spring constants ka to kc of the support sections 20a to 20c are adjusted by using the S-springs 23a to 23c and the connecting members 24a to 24c, in the second embodiment, spring constants are adjusted by using panel members 25a and 25b, and tension members 26a and 26b. In the following, the second embodiment is described in detail. However, members similar to those in the first embodiment are indicated with same reference numbers, and detailed description thereof is omitted.

Figure 11:
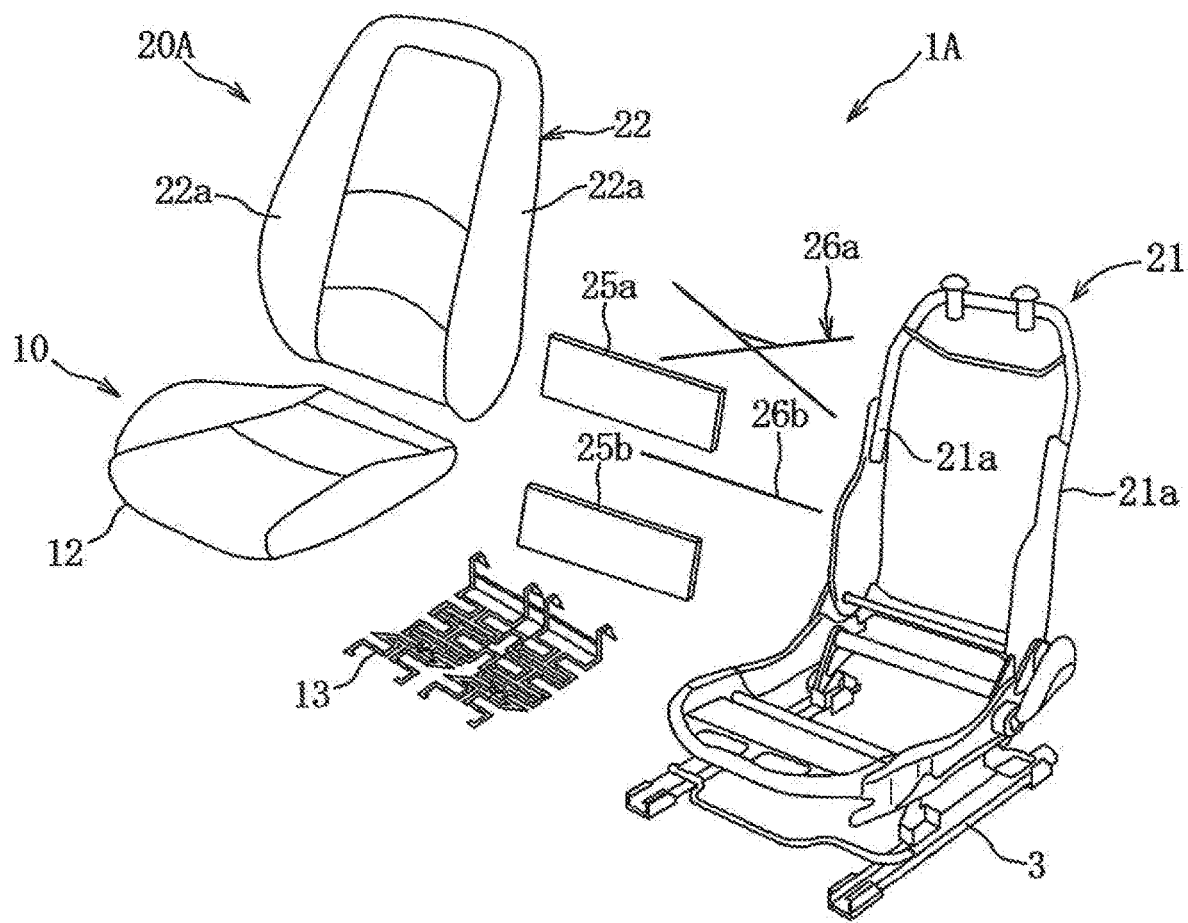
FIG. 11 is an exploded perspective view of a vehicle seat according to a second embodiment of the present invention.

As illustrated in FIG. 11, a seat back 20A includes a metal frame member 21 for imparting a structural strength to the seat back 20A, a polyurethane cushion member 22, the synthetic resin panel members 25a and 25b, the tension members 26a and 26b, and an outer cover member for covering these elements.

The panel members 25a and 25b, and the tension members 26a and 26b are formed to connect left and right lateral frame portions 21a of the frame member 21 to each other.

The upper panel member 25a is disposed at a position corresponding to an upper thoracic support section 20a (a position overlapping with an upper thoracic support section 20a in a front view). The lower panel member 25b is disposed below and away from the upper panel member 25a, and at a position corresponding to a lower thoracic support section 20b.

Figure 12:
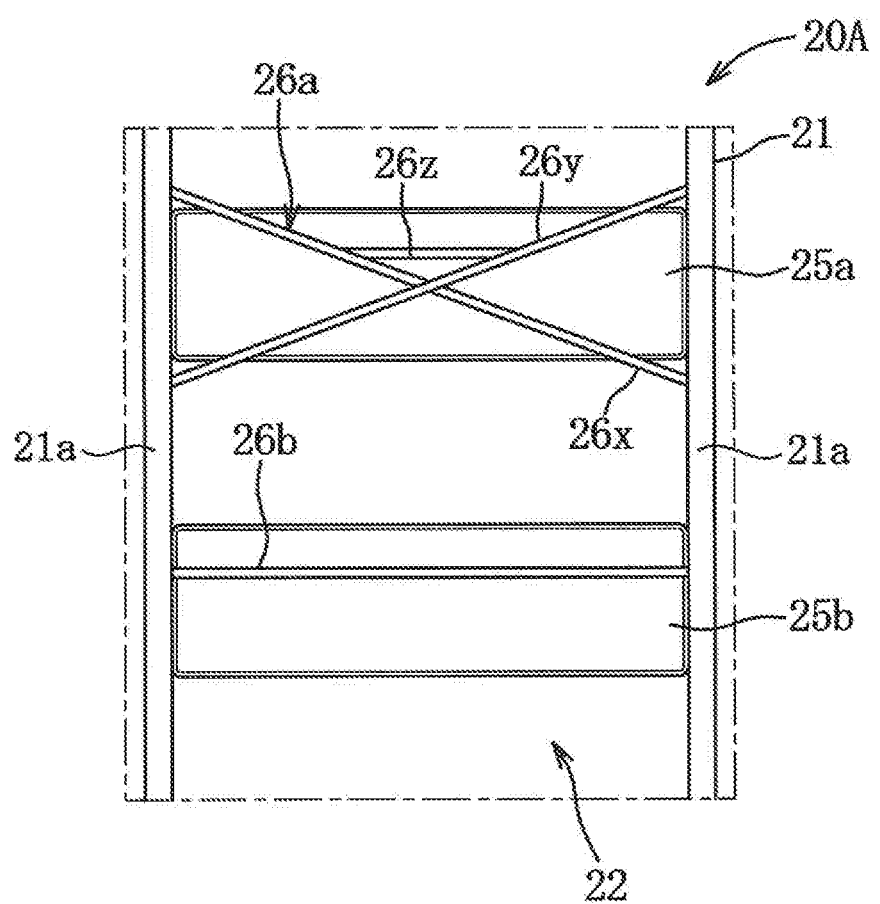
FIG. 12 is a partial rear view of a seat back in a state that illustration of an outer cover member is omitted.

As illustrated ire FIG. 12, the upper tension member 26a is constituted of three string-like members 26x to 26z having predetermined elastic characteristics.

The string-like wire members 26x and 26y are fixed to the frame member 21 (lateral frame portion 21a) at positions near four corners of the upper thoracic: support section 20a, and are disposed to intersect with each other at a center of the upper thoracic support section 20a. The string-like wire member 26z is disposed to connect midway portions (portions, on the upper side with respect to the intersection of the wire members 26x and 26y) of the string-like wire members 26x and 26y to each other in the left-right direction in an area on the upper side with respect to the center of the upper thoracic support section 20a.

The intersection of the string-like wire members 26x and 26y is located immediately above a lower end support section 20e (FIG. 7). Disposing the intersection of the string-like wire members 26x and 26y above the lower end support section 20e, and the string-like wire member 26z as described above allows the lower end support section 20e corresponding to the seventh thoracic T7 to slightly depressed, as compared with the periphery thereof, during acceleration traveling. Further, supporting lower parts of the scapula areas of the occupant D by lower portions of the string-like wire members 26x and 26y, when the vehicle makes a turn, makes it easy to perform a steering operation by the occupant D.

The lower tension member 26b is constituted of a single string-like wire member having predetermined elastic characteristics. The tension member 26b is disposed to extend in the left-right direction at a position slightly above a center of a lumbar support section 20c.

Thus, a spring constant kc of the lumbar support section 20c becomes largest at a position slightly above the center of the lumbar support section 20c (in other words, at a position where the tension member 26b is disposed). Further, the spring constant kc linearly decreases, as the lumbar support section 20c extends upward or downward from the position where the tension member 26b is disposed.

Further the spring constant kc of the lumbar support section 20c is set to be higher than a spring constant kb of the lower thoracic support section 20b, and is set to be lower than a spring constant ka of the upper thoracic support section 20a.

A spring constant of an upper middle support section 20f and a spring constant of a lower middle support section 20g are adjusted by changing spring characteristics of the cushion member 22, in addition to adjustment of the panel member 25a and 25b, and the tension members 26a and 26b.

<Modifications>

Next, modifications in which the embodiments are partially modified are described.

[1] The first embodiment describes an example in which the lower end support section 20e is formed in a part (lower middle part) of the upper thoracic support section 20a, and the spring constant ke of the lower end support section 20e is set smaller than the spring constant ka' of the other part (part of the upper thoracic support section 20a other than the lower end support section 20e), Alternatively, the spring constant ke and the spring constant ka' may be set to a same value.

[2] Further, conversely to the first embodiment, a sprig constant ke of a lower end support section 20e of an upper thoracic support section 20a may be set to a value larger than a spring constant ka' of a part of the upper thoracic support section 20a other than the lower end support section 20e. In this case, the formula (1) is rewritten into the following formula (10).

$$kb<kc \leq ka'<ke<kd \qquad (10)$$

In case where the spring constant ke is set larger than the spring constant ka' as described above, when backward inertia force acts on the occupant D, backward movement of the seventh thoracic T7 of the occupant D is sufficiently suppressed by the lower end support section 20e having the relatively high spring constant ke, and backward movement of the scapula of the occupant is easily performed by a portion (a portion around the lower end support section 20e) having the relatively low spring constant ka'. This enables to secure a degree of freedom of a steering operation by the occupant D, while stably supporting the seventh thoracic T7 of the occupant D on the seat back 20.

[3] the first embodiment describes an example in which the spring constant ka (ka', ke) of the upper thoracic support section 20a is set to be equal to or higher than the spring constant kc of the lumbar support section 20c (kc≤ka). Alternatively, the magnitude relationship between ka and kc may be opposite. Specifically, the upper thoracic support section 20a and the lumbar support section 20c may be formed to satisfy a relationship: ka (ka', ke)≤kc. This is advantageous in suppressing the head of the occupant D from inclining backward, and making a behavior of the head similar to parallel movement as much as possible.

[4] The first embodiment describes an example in Which the spring constant kh of the paired left and right intermediate support sections 20h is set larger than the spring constant kc of the lumbar support section 20c, and the spring constant kd of the paired left and right outer edge support sections 20d is set larger than the spring constant kh of the paired left and right intermediate support sections 20h (kc<kh<kd). Alternatively, the magnitude relationship between kc and kh may be opposite. Specifically, the portions 20c, 20d, and 20h may be formed to satisfy a relationship: kh<ke<kd. This enables to improve seating comfort on the seat 1, and stabilize the posture of the occupant D when the vehicle makes a turn.

[5] The first and second embodiments describe an example in which the spring constant kb of the lower thoracic support section 20b is fixed within the support section 20b. Alternatively, the spring constant kb may be decreased, as the lower thoracic support section 20b extends downward.

[6] The second embodiment describes an example in, which the spring constants of the support sections are adjusted by the panel members 25a and 25b, and the tension members 26a and 26b. Alternatively, the spring constants may be adjusted by combining these elements, and the S-springs 23a to 23c used in, the first embodiment. Further, When S-springs are used in combination, it is also possible to additionally use the connecting members 24a to 24c used in the first embodiment, as necessary.

[7] The first and second embodiments describe an example in which the first and second functions (the head inclination suppressing function and the upper arm support section forming function) of the backward movement adjustment mechanism are achieved by adjustment of the spring constants of the support sections. However, any configuration is available, as far as at least backward movement can be adjusted for each skeletal part of the occupant D. For example, a backward displacement amount of each of the support sections may be controlled according to a traveling state by configuring the support sections to be displaceable independently of one another, and forming a driving portion for displacing each of the support sections in the front-rear direction, In this case, the following structure may be employed in order to integrally move a frame, a cushion, and an elastic member.

(i) A frame member of a seat back has a double-layer structure including an outer fame and an inner frame.

(ii) The outer frame is configured to be unmovable in order to protect the occupant at a time of side collision.

(iii) The inner frame is configured to directly support the cushion and the elastic member.

(iv) The inner frame, the cushion, and the elastic member are divided for each of the support sections, and are moved in the front-rear direction by the driving portion for each of the support sections.

[8] In addition to the above, a person skilled in the art may add various modifications to the embodiments or combine the embodiments, as far as the modifications do not depart from the gist of the present invention. The present invention also includes such modifications.

<Overview of Embodiments>

The following is an overview of the embodiments.

A vehicle seat structure according to a first aspect is provided with a seat cushion and seat back. The seat back includes an upper thoracic support section for supporting at least a portion corresponding to a lower part of the upper thoracic spine of a seated occupant and a lower thoracic support section disposed on a front side with respect to the upper thoracic support section and configured to support a portion corresponding to the lower thoracic spine of the seated occupant. The lower, thoracic support section is configured, when backward inertia force acts on the seated occupant, to displace backward greatly, as compared with the upper thoracic support section according to the inertia force in such a way that the upper thoracic spine of the seated occupant is inclined forward.

In the vehicle seat structure according to the first aspect, since the seat back includes the upper thoracic support section for supporting the portion corresponding to the lower part of the upper thoracic spine, and the lower thoracic support section for supporting the portion corresponding to the lower thoracic spine, it is possible to individually set support characteristics of the upper thoracic support section and the lower thoracic support section.

Further, since it is possible to displace the lower thoracic support section backward greatly, compared with the upper thoracic support section, when backward inertia force acts on the seated occupant, it is possible to generate a rotational moment in such a direction as to incline the upper thoracic spine forward, and it is possible to suppress the head of the seated occupant from inclining backward. Specifically, by the forward rotational moment, it is possible to suppress the head of the seated occupant from, inclining backward about the cervical-thoracic transitional vertebrae, and maintain the physiological lordosis of the seated occupant.

Preferably, the seat back may include a lumbar support section disposed on the front side with respect to the lower thoracic support section and configured to support a portion responding to the lumbar spine of the seated occupant. The lower thoracic support section may be configured to displace backward greatly, as compared with the lumbar support section, when backward inertia force acts on the seated occupant.

In this configuration, it is possible to individually set support characteristics oldie lumbar support section, in addition to the upper thoracic support section and the lower thoracic support section. Further, it is possible to maintain the physiological lordosis of the occupant without depending on a behavior of the vehicle.

A vehicle seat structure according to a second aspect is provided with a seat cushion and a seat back. The seat back includes an upper thoracic support section for supporting at least a portion corresponding; to a lower part of the upper thoracic spine of a seated occupant, a lower thoracic support section disposed on a front side with respect to the upper thoracic support section and configured to support a portion corresponding to the lower thoracic spine of the seated occupant, and a lumbar support section disposed on the front side with respect to the lower thoracic support section and configured to support a portion corresponding to the lumbar spine of the seated occupant. A spring constant of the lower thoracic support section is lower than a spring constant of the upper thoracic support section and a spring constant of the lumbar support section.

The vehicle seat structure according to the second aspect provides, in addition to the advantageous effects by the vehicle seat structure according to the first aspect, an advantageous effect that it is possible to displace the lower thoracic support section backward greatly, as compared with the upper thoracic support section and the lumbar support section with a simplified configuration.

Preferably, the vehicle seat structure may further include: an upper middle support section disposed between the upper thoracic support section and the lower thoracic support section; and a lower middle support section disposed between the lower thoracic support section and the lumbar support section. A spring constant of the upper middle support section may be set to an intermediate value between a spring constant of the upper thoracic support section and a spring constant of the lower thoracic support section. A spring constant of the lower middle support section may be set to an intermediate value between a spring constant of the lower thoracic support section and a spring constant of the lumbar support section.

In the above configuration, it is possible to reduce incongruity of the occupant by moderating a change in spring constant. Further, since spring characteristics of the seat back are set to arc-shaped characteristics such that the spring characteristics are substantially and vertically symmetrical with respect to the lower thoracic support section, it is possible to reduce incongruity of the occupant, white securing holdability, regardless of a difference in physical constitution to some extent.

In the above configuration, preferably, the upper thoracic support section may include a part having a spring constant substantially equal to a spring constant of the lumbar support section.

In the above configuration it is possible to impart, to the seat back, support characteristics symmetrical with respect to the lower thoracic support section.

In the above configuration, more preferably, the upper thoracic support section may include a part having a spring constant larger than a spring constant of the lower thoracic support section by 20 N/m or more.

In the above configuration, it is possible to securely suppress the head of the occupant from inclining backward about the cervical-thoracic transitional vertebrae during acceleration traveling of the vehicle.

Preferably, the upper thoracic support section may include a part having a spring constant in a range from 5/4 to 7/4 of a spring constant of the lower thoracic support section.

In the above configuration, it is possible to securely suppress the head of the occupant from inclining backward about the cervical-thoracic transitional vertebrae during acceleration traveling of the vehicle, while securing comfort of the occupant.

The invention claimed is:

1. A vehicle seat structure provided with a seat cushion and a seat back, wherein
the seat back includes:
an upper thoracic support section for supporting at least a portion corresponding to a lower part of the upper thoracic spine of a seated occupant;
a lower thoracic support section disposed on a front side with respect to the upper thoracic support section and configured to support a portion corresponding to the lower thoracic spine of the seated occupant;
a lumbar support section disposed on the front side with respect to the lower thoracic support section and configured to support a portion corresponding to the lumbar spine of the seated occupant;
an upper middle support section disposed between the upper thoracic support section and the lower thoracic support section; and
a lower middle support section disposed between the lower thoracic support section and the lumbar support section; and
wherein
a spring constant of the lower thoracic support section is lower than a spring constant of the upper thoracic support section and a spring constant of the lumbar support section,
a spring constant of the upper middle support section is set to an intermediate value between a spring constant of the upper thoracic support section and a spring constant of the lower thoracic support section, and
a spring constant of the lower middle support section is set to an intermediate value between a spring constant of the lower thoracic support section and a spring constant of the lumbar support section.

2. The vehicle seat structure according to claim 1, wherein the upper thoracic support section includes a part having a spring constant substantially equal to a spring constant of the lumbar support section.

3. The vehicle seat structure according to claim 2, wherein the upper thoracic support section includes a part having a spring constant larger than a spring constant of the lower thoracic support section by 20 N/m or more.

4. The vehicle seat structure according to claim 1, wherein the upper thoracic support section includes a part having a spring constant in a range from 5/4 to 7/4 of a spring constant of the lower thoracic support section.

* * * * *